United States Patent
Bakke et al.

(10) Patent No.: US 6,551,510 B1
(45) Date of Patent: Apr. 22, 2003

(54) METHOD FOR TREATMENT OF ORGANIC MATERIAL IN A TWO-STEP ANAEROBIC BIOCHEMICAL REACTOR

(75) Inventors: Rune Bakke, Skien (NO); Morten Rambekk, Porsgrunn (NO); Jo-Ela Johansen, Skien (NO)

(73) Assignee: Norsk Hydro Asa, Oslo (NO)

(*) Notice: Subject to any disclaimer, the term of this patent is extended or adjusted under 35 U.S.C. 154(b) by 0 days.

(21) Appl. No.: 09/869,041
(22) PCT Filed: Dec. 15, 1999
(86) PCT No.: PCT/NO99/00384
§ 371 (c)(1),
(2), (4) Date: Sep. 27, 2001
(87) PCT Pub. No.: WO00/39036
PCT Pub. Date: Jul. 6, 2000

(30) Foreign Application Priority Data

Dec. 23, 1998 (NO) .............................. 19986126

(51) Int. Cl.⁷ .............................. C02F 11/04; C02F 3/28
(52) U.S. Cl. ........................................ 210/603; 210/614
(58) Field of Search ................................ 210/603, 605, 210/614, 195.1

(56) References Cited

U.S. PATENT DOCUMENTS

| | | | |
|---|---|---|---|
| 2,893,957 A | * | 7/1959 | Genter et al. |
| 3,981,800 A | * | 9/1976 | Ort |
| 4,722,741 A | * | 2/1988 | Hayes et al. |
| 4,735,723 A | * | 4/1988 | Mulder |
| 4,781,836 A | * | 11/1988 | Thiele et al. |
| 5,500,123 A | * | 3/1996 | Srivastava |
| 5,525,228 A | * | 6/1996 | Dague et al. |
| 5,746,919 A | * | 5/1998 | Dague et al. |
| 5,853,589 A | | 12/1998 | Desjardins et al. |

FOREIGN PATENT DOCUMENTS

WO 94/19119 9/1994

OTHER PUBLICATIONS

Abstract of JP 62–286592 (Dec. 12, 1987).

* cited by examiner

*Primary Examiner*—Fred Prince
(74) *Attorney, Agent, or Firm*—Wenderoth, Lind & Ponack, L.L.P.

(57) ABSTRACT

The present invention relates to a method for treatment of organic material, grown for energy production or being organic waste which is slurried, suspended or dissolved in liquid, in a two-step anaerobic biochemical reactor configuration comprising recirculation between the two reactors. The organic material is fed to the first reactor where most of the hydrolysis and dissolution of the organic material takes place, resulting in formation of volatile fatty acids (VFA). Liquid material from the first reactor is transferred to the second, methanogenesis reactor where the treatment is finalized. The amount of VFA in each reactor is forced to oscillate within pre-set upper and lower limits by pulsed recirculation between the two reactors. The amount of VFA in the reactors can be controlled by varying the recirculation rate of liquid between the reactors. The pH or the conductivity in the reactors can be monitored and used for calculating and controlling the amount of VFA in both reactors.

4 Claims, 2 Drawing Sheets

METHOD FOR TREATMENT OF ORGANIC MATERIAL IN A TWO-STEP ANAEROBIC BIOCHEMICAL REACTOR

This application is a 371 application of PCT/NO99/00384 filed Dec. 15, 1999.

The present invention relates to treatment of organic material, grown for energy production or organic waste, which is slurried, suspended or dissolved in liquid, in a two-step anaerobic biochemical reactor configuration comprising recirculation between the two reactors. The organic material is fed to a first reactor in which hydrolysis and dissolution take place resulting in formation of volatile fatty acids. Liquid is transferred from the first reactor to the second, methanogenesis reactor where the treatment is finalized.

In processes as defined above, the organic waste is fed to a first reactor in which hydrolysis and dissolution of particulated material to carbohydrates, oligopeptides and fatty acids takes place. Volatile fatty acids (VFA) are formed when the hydrolysis products are broken down. In the second reactor the VFA are broken down to acetate and methane where methane is produced by cleavage of acetate or reduction of carbon dioxide by means of hydrogen. The microbial activity in each stage depends on specific environmental conditions with regard to temperature, pH, availability of substrate and inhibiting substances. One group of such inhibiting substance with regard to the methanogenesis and also hydrolysis is VFA. A major problem in such processes is therefore to control and/or adjust the presence of VFA in the two reactors in order to obtain an efficient process with regard to conversion of the organic material to methane.

Two-step anaerobic biological processes are generally known in the art. Thus it is known from Forschungsprojekt Nr. 2020, Forschungsbericht arbi, Arbeitsgemeinschaft Bioenergi 8933 Maschwanden, a two-step anaerobic digestion process for treatment of organic solid waste. The process permits separation of the solid and liquid phase allowing the operation of high rate anaerobic methanogenesis for the liquid. Circulating water is used for extraction of VFA and other components which are dissolved in the hydrolytic step. The water is treated in the methanogenic step in a pulsating dynamic filter before being recirculated to the hydrolytic step. Over 90% of the methane is generated in the methanogenic step. More than 80% of easily degradable organic waste is converted into biogas in less than 5 days.

The rate limiting stage will often be the hydrolyses and special measures must therefore be made. As the organic material is mainly solids, the formation of VFA will depend on the particle size of said solids. The special provisions for regulating the VFA will cause special problems.

Further there is described a two-phase anaerobic wastewater treatment system in Water Research Vol. 28, No. 2 pp 475–482 1994. The overall performance of the system was determined as a function of the extent of recycle of the effluent from the methanogenic reactor to the acidification reactor. The acidification stage was controlled at pH 6 by automatic addition of caustic soda, and a sand bed reactor for the methanogenic stage which was left uncontrolled. The required use of caustic soda will make such a process expensive.

Treatment of grass-clover silage in an anaerobic two-phase biogas process is further known from Antonie van Lecuwenhoeck 68: pp 317–327, 1995. Also in this process liquid recirculation was applied. Increased acetate in both reactors after initiating liquid recirculation was observed. It was found that liquid recirculation in silage-fed two-phase biogas processes will stimulate the activity of hydrogenotrophic methanogenesis in the liquification-acidogenic reactor leading to more thermodynamically favourable conditions for acidification reactions which are dependent upon interspecies transfer of reducing equivalents. Also this process utilizes solid organic material in the hydrolysis reactor. A further disadvantage of this process is that it is controlled on volume basis only.

The main object of the invention was to arrive at an improved two-step anaerobic biological process for treatment of organic material giving higher yield with regard to conversion of the organic material and methane production.

Another object was to arrive at an optimal process, especially with regard to VFA content in both reactors.

A further object was to obtain optimal pH-ranges for the processes in both reactors without use of pH regulating chemicals.

During further studies of the processes in the two reactors it was found that the simplest way of controlling and optimizing the operating conditions in both reactors might be obtained by changing the conventional flow of liquid/substrate between the two reactors. Though the invention is described with regard to application in a two-reactor system, it will be within the scope of the invention to utilize the same principle in a multi reactor system. It was found that the recirculation of the liquid phase between the two reactors could be performed according to various principles. The simplest principle (Q1) seemed to be applying a fixed recirculation rate independent of other parameters in the reactors. However, the organic load in a biogas system will not be constant, and the system will therefore to some extent be dynamic. Accordingly it was found that a fixed recirculation rate would not be desired.

The inventors then tried to apply another principle (Q2) which comprised changing the degree of recirculation in view of obtaining optimal operating conditions in both reactors and thereby obtain an overall improved efficiency of the process. The main reason for applying recirculation will be control of VFA and pH in the system. Reliable monitoring of the VFA content was found to be most difficult, but pH in the system will be influenced by the VFA content, and it was decided to rely on pH measurements as steering/controlling parameter. Though this approach seemed promising, it was found that operating at fixed optimal pH values in the respective reactors for acidogenesis and methanogenesis, known from the literature, would not constitute the optimal solution to the problem. It was then decided to switch the recirculation off and on for selected periods (Q3). This could for instance be performed by switching the recirculation on when the pH in the first reactor reaches a pre-determined lower level. When the pH passes the upper level the recirculation will be switched off. It may alternatively be switched off after a predetermined time period. Oscillation of pH and VFA-concentration in the reactor will thereby be attained. The recirculation may alternatively be switched off after a predetermined time period. The VFA concentrations in the reactors can also be controlled in a similar way by applying conductivity measurements or other suitable ways of measuring or detecting the influence of varying the amount/concentration of VFA in the reactors. Methane production ($m^3/h$) has for instance been found to be a useful parameter for controlling the process. By allowing the VFA concentration to oscillate, the recirculation will pulsate at a variable rate according to the load of organics in the reactors.

The various ways of performing the recirculation, as described above, are shown in FIG. 2.

The main feature of the method according to the invention is that the amount of volatile fatty acid in each reactor is forced to oscillate within pre-set upper and lower limits by pulsed recirculation between the two reactors.

The amounts of VFA in the reactors can be controlled by varying the recirculation rate between the reactors.

The pH or conductivity in the liquid in the reactors can be monitored and used for calculating and controlling the amount of VFA in both reactors. The pH in each reactor can be allowed to vary within pre-set values.

Principally, any parameters which indicate variations of VFA concentrations and/or pH in the respective reactors could be monitored such that they can be used for calculating and controlling the VFA in the reactors.

The scope of the invention and its special features are as stated in the attached claims.

The invention will be further explained in connection with the description of the figures and the examples.

Figure 1:
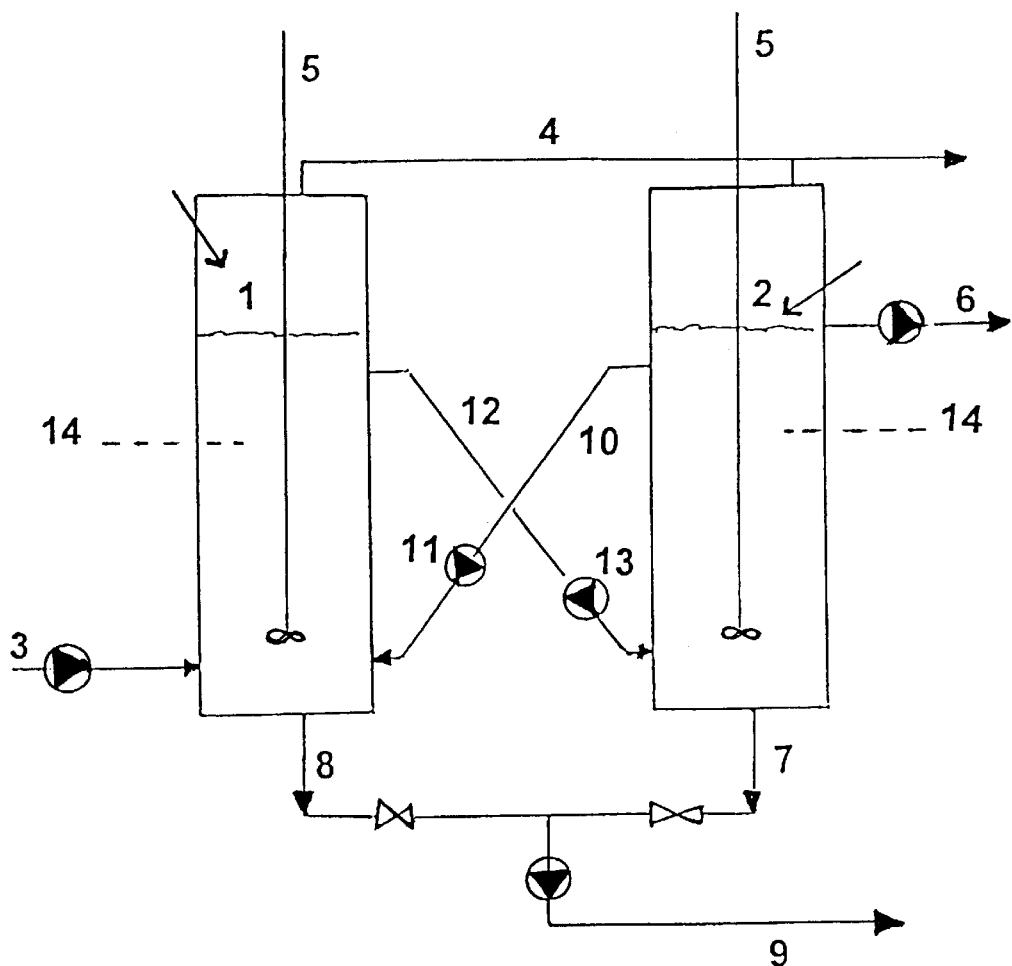
FIG. 1 shows schematically a two-step anaerobic reactor system applied for the method according to the invention.

In FIG. 1 is shown a conventional two-step anaerobic reactor system in which the method according to the invention can be performed. Organic material is supplied through a pipe 3 to reactor 1 where the hydrolysis and dissolution of organic material take place. VFAs are formed in reactor 1, and these are broken down in reactor 2. Both reactor 1 and 2 can be equipped with stirring or agitating devices 5. Biogas formed in reactors 1 and 2 are collected and removed from the system thorough pipe 4. Stabilized sludge can be drawn from the reactors 1 and 2 through the respective pipes 8 and 7 and further discharged from the system through conduit 9. The sludge system comprises necessary valve, pumps and regulating/monitoring devices to comply with the over all control of the total system. An external recirculating system connecting reactors 1 and 2 comprises pipes 12 with pump 13 and pipe 10 with pump 11. The liquid is transferred from the upper level of one reactor and supplied to the lower level of the other reactor. Treated liquid can be discharged from the upper level of reactor 2 through pipe 6 which may comprise a pump. Both reactors are equipped with monitoring devices 14. Parameters like pH, temperature etc. for desired control of the system can accordingly be measured and monitored. The monitored signals are used to control and optimize the biogas plant. The controller has to control four main functions, i.e. temperature in both reactors, inflow, fluid recirculation rate between the reactors 1 and 2 and additional agitation. Further it was found that solid retention time (SRT) and hydraulic retention time (HRT) should be controlled in order to secure optimal results. HRT could easily be monitored by inflow 3. SRT seemed to be best monitored indirectly by extracting solids from reactor 1 or 2 through lines 8 or 7. Water/fluid recirculation rate between reactors can be controlled by utilizing the monitoring devices 14 and the inherent control devices of the valves and pumps of the system.

Figure 2:
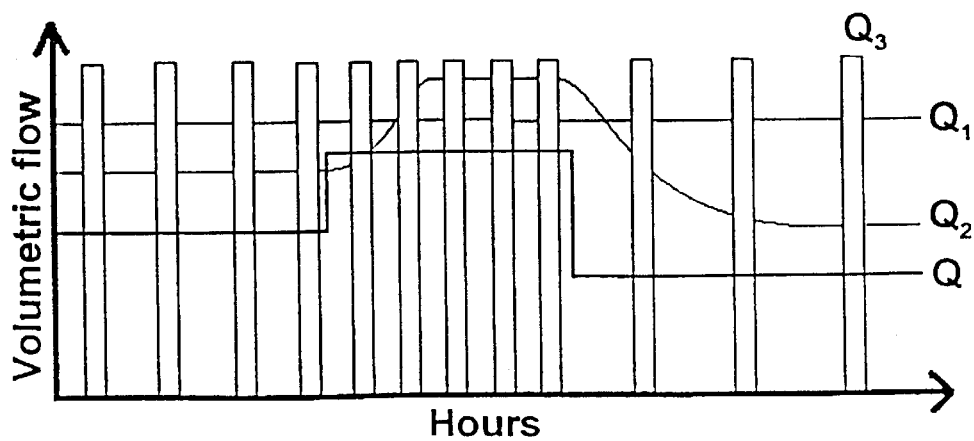
FIG. 2 shows the volume streams of feed and recirculation depending on type of recirculation.

Examples of volumetric flow as function of time in hours are shown in FIG. 2 for the three types of recirculation described above. Curve Q designates the feed, Q1 designates fixed recirculation rate, Q2 designates recirculation regulated in view of optimal operating conditions on both reactor 1 and 2. The vertical bars, Q3, show the effect of pulsating recirculation according to the invention.

Figure 3:
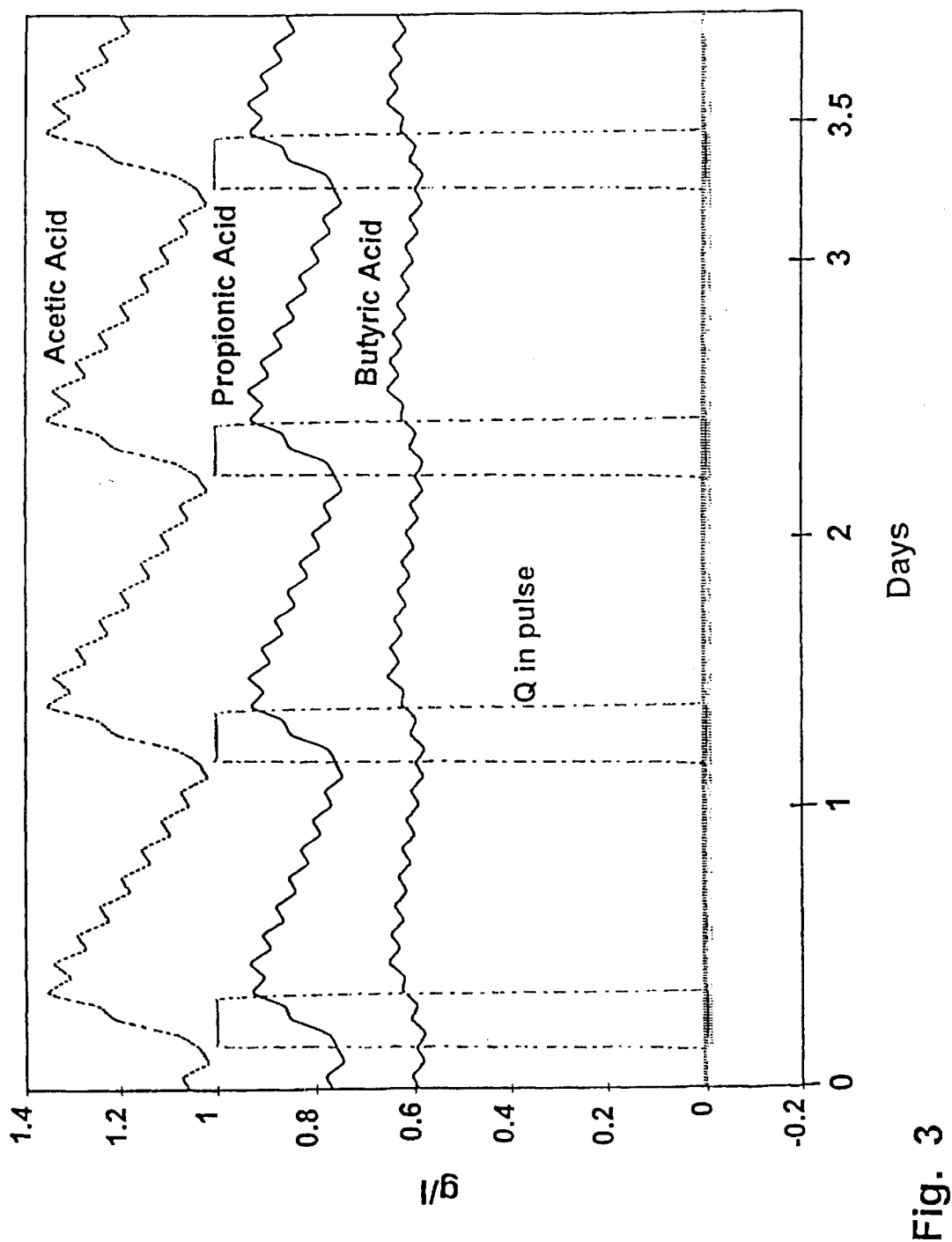
FIG. 3 shows simulated effects on specified volatile fatty acids.

FIG. 3 shows VFA concentrations, acetic acid, propionic acid and butyric acid respectively, in reactor 1 with sequential feed Qin pulse (10 m$^3$/day) in 5.8 hours per day with sequential water recirculation of 10 times a day, 8 minutes pulses every 2.5 hours. The VFA concentrations are given as gram/liter (g/l) versus time in days. Further optimalisations have been found to reduce the peaks for acetic acid and propionic acid shown in the figure. In the figure there is one day between each 5.8 hour pulse.

EXAMPLE 1

This example shows anaerobic digestion of organic material in a two-phase reactor system shown in FIG. 1 and where the recirculation is controlled in order to achieve constant, desirable amount of VFA in both reactors. The recirculation between reactor 1 and 2 was run in view of keeping the pH at its optimum in both reactor 1 and 2. According to literature data this means that the pH in reactor 1 should be kept at pH 4.5–5.5 and the pH in reactor 2 should be kept at pH 6.8–7.4 for most relevant (protein and fat containing) organic matter. The operating conditions were:

Reactor volumes=20 m$^3$ for each reactor. The feed to reactor 1 was:

Constant volumetric loading rate=2.43 m$^3$/day of cattle manure, containing

Suspended organic matter=30.6 g COD/l

Soluble organic matter–5.4 g COD/l 30 m$^3$/day of reactor liquid was recirculated continuously between the reactors.

By performing the process as stated above a conversion of manure to 44 kg methane/day was obtained.

EXAMPLE 2

This example shows treatment of organic material in the same type of reaction system as in Example 1, but now the concentration of VFA in both reactors was forced to oscillate within pre-determined ranges, close to the desirable VFA level in both reactors. The oscillations were imposed through pulsed recirculation between reactor 1 and 2. The operating conditions were:

Reactor volumes for each reactor:=20 m$^3$/day. The feed to reactor 1 was:

Constant volumetric loading rate:=2.42 m$^3$/day of cattle manure, containing:

Suspended organic matter:=30.6 g COD/l

Soluble organic matter:=5.4 g COD/l 30 m$^3$/day of reactor liquid was recirculated in 8 min. pulses every 2.5 hours between the reactors.

By performing the process as stated above a conversion of manure to 44 kg methane/day was obtained.

The conversion of manure to methane in the two examples will be approximately the same However, there will be an advantage in applying the strategy of Example 2. This strategy will give improved process control due to the imposed oscillations. This will yield a more robust process monitoring and a process which will adapt more efficiently to changes in quality and amount of feed. It also allows for using more indirect, but robust measurement in automated process control.

What is claimed is:

1. Method for treatment of organic material, grown for energy production or being organic waste which is slurried, suspended or dissolved in liquid, in a two-step anaerobic biochemical reactor configuration comprising recirculation between two reactors, and where the organic material is fed to a first reactor where hydrolysis and dissolution of the organic material takes place, resulting in formation of volatile fatty acids, and transfer of liquid material from the first reactor to a second, methanogenesis reactor where the treatment is finalized, wherein the amount of volatile fatty acid in each reactor is forced to oscillate within pre-set upper and lower limits by pulsed recirculation between the two reactors, whereby the amounts of fatty acid in the reactors are controlled by switching on the recirculation when the pH in the first reactor reaches a predetermined lower level and when the pH passes a predetermined upper level the recirculation will be switched off.

2. Method according to claim 1, wherein the pH in the reactors is monitored and used for calculating and controlling the amount of volatile fatty acid in both reactors, and the pH in each reactor is allowed to vary within pre-set values.

3. Method according to claim 1, wherein the conductivity of the liquid/slurry in the reactors is monitored and used for calculating and controlling the amounts of volatile fatty acid in the reactors.

4. Method according to claim 1, wherein methane production in $m^3/h$ is monitored and utilized for controlling the method by allowing the concentration of volatile fatty acid to oscillate, whereby the recirculation will pulsate at a variable rate according to the load of organics in the reactors.

* * * * *